G. L. JAEGER.

Partition for Boxes.

No. 9,762. Reissued June 14, 1881.

Witnesses
Otto Hufeland
William Miller

Inventor
Gustav L. Jaeger
by Van Santvoord & Huff
his att'ys

UNITED STATES PATENT OFFICE.

GUSTAV L. JAEGER, OF NEW YORK, N. Y.

PARTITION FOR BOXES.

SPECIFICATION forming part of Reissued Letters Patent No. 9,762, dated June 14, 1881.

Original No. 219,732, dated September 16, 1879. Application for reissue filed May 13, 1881.

*To all whom it may concern:*

Be it known that I, GUSTAV L. JAEGER, a citizen of the United States, residing at New York, in the county and State of New York, have invented a new and useful Improvement in Partitions for Boxes, of which the following is a specification.

This invention relates to improvements in that class of partitions for boxes which are slitted, so that the intersecting parts can be locked together.

The objects of this invention are to construct the partitions in such manner as to avoid waste of material, while providing the requisite strength and rigidity, and to facilitate the assemblage of the partitions in their proper relative positions, and to render their interlocking firm and secure.

My invention consists in forming partitions for boxes with serpentine edges, so that the projection or peak of one edge will alternate with or be directly opposite the curved recess of the other edge, whereby said partitions are adapted to be cut to a certain height without loss of material, and at the same time the strength and rigidity of the material are not impaired, because the material left to form the projection or peak is opposite to and corresponds with the portion cut out to form the curved recess.

My invention further consists in a partition having within its body portion slots which form hooks or shoulders at the outer portions of said slots, and having in their marginal edges notches or recesses, with both sides inclined outwardly, and communicating with the aforesaid slots by slits or passages extending past the hooks or shoulders, as will be more fully hereinafter set forth.

Figure 1:
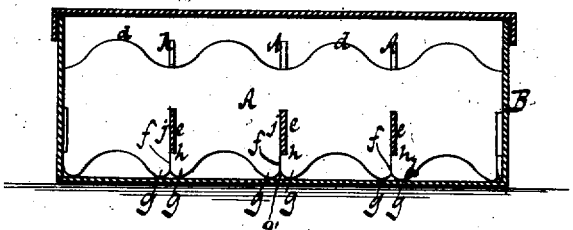
Figure 2:
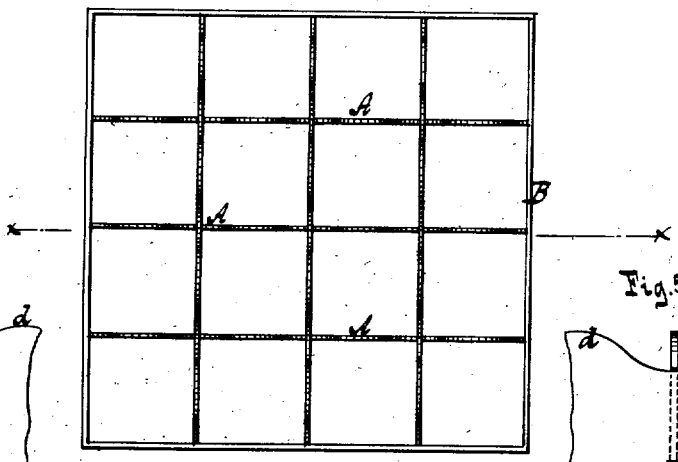
Figure 4:
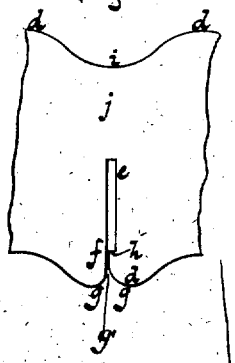
Figure 3:
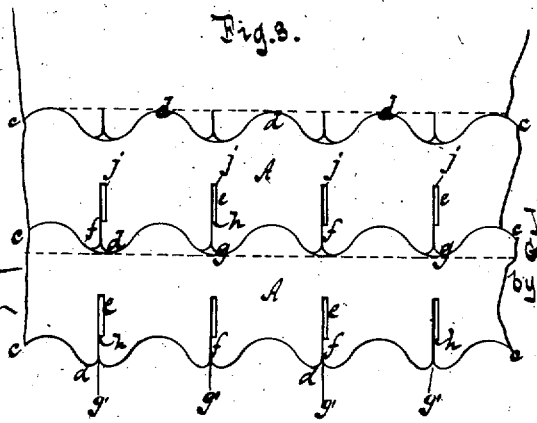

In the accompanying drawings, Figure 1 represents a vertical cross-section of a box provided with partitions constructed according to my invention, the line *x x* of Fig. 2 indicating the plane of the section. Fig. 2 is a plan or top view thereof; Fig. 3, a diagram illustrating the manner of cutting out the partitions. Fig. 4 is a face view on an enlarged scale, showing one of the partitions detached; and Fig. 5 is a similar view showing one of the intersecting partitions locked in position.

The letters A indicate the partitions, and B a box into which the partitions are fitted. The box and partitions are made of paper; but it is obvious that the partitions can be made of any other suitable material. The partitions shown are formed of strips, and have serpentine or undulating edges, and to form the same I cut a piece of pasteboard or other material in serpentine or zigzag substantially parallel lines, as at *c*, Fig. 3, the part between each of these lines constituting the body portion of the partition. In the example shown the lines *c* are serpentine; but the shape thereof is capable of various modifications which are adapted to produce a like effect—as, for instance, the edges may be serrated. The height of each of the partitions is from the peaks *d* on one edge thereof to those on the opposite edge. Now, observing that to produce a partition of like height with straight edges it would be necessary to cut the material in the plane of the peaks *d*, as indicated by dotted line in Fig. 3, it will be seen that a piece of material equal to the height of two of the peaks is saved to each partition by forming the same in the manner described.

The strips composing the partitions are provided within their body portions with slots *e*, so as to form at the outer portions of said slots the laterally-projecting hooks or shoulders *h*, and the marginal edges of the partition-strips are provided with notches or recesses *g'*, having both their sides or edges beveled or chamfered and diverging outwardly, as indicated by the letters *g g*. These marginal notches or recesses *g'* are in communication with the slots *e* by means of slits or passages *f*, which extend from the marginal notches or recesses inward past the hooks *h* and into the said slots.

Figure 5:
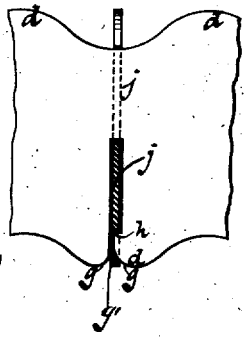

In order to bring the partitions together or assemble them in proper position they are arranged crosswise and forced upon each other, thereby bringing a solid portion, *j*, of one partition into the slot *e* of the other partition, with its under edge behind the hook *h*, as clearly shown in Figs. 1 and 5. In this manner the partitions are made to cross each other, and as the slots *e* are practically closed at both ends, the intersecting portions of the several partitions are firmly joined and interlocked with each other. Any attempt to separate the partitions by pulling them apart is resisted by the hooks or shoulders *h*, which engage the under edges of the intersecting partitions. As both sets of the partitions are provided with the hooks arranged as described, each partition is locked where it crosses the other partition in a very firm and secure manner, thereby providing an effective interlocking connection.

In the assemblage of the partitions in their proper relative and interlocked positions the marginal notches or recesses *g'*, being beveled or chamfered on both their edges or sides and diverging outwardly, perform very important functions, in that they serve to accurately guide and direct the intersecting partition into the slits or passages *f*, past the hooks or shoulders *h*, and into the slots *e*, thereby greatly facilitating the connection or interlocking of the partitions.

I do not claim, broadly, the idea of saving material in constructing partitions for boxes; but I do claim the form of the partition, as hereinbefore described, and shown in the accompanying drawings—that is to say, when the same are constructed with undulating edges, with the peak or projection on one edge directly opposite the curved recess on the other edge; and from said form results the advantages secured, not only that of saving material, but of having the said partitions sufficiently rigid to hold the articles—such as eggs—to be transported in place, yet in a certain degree yielding or elastic, so as to counteract jars or shocks to which the boxes during transportation are subjected, which beneficial results cannot be attained if the partitions be made with straight edges, or with curved recesses opposite each other.

What I claim is—

1. As a new article of manufacture, a partition for boxes having undulating top and bottom edges, the projections or peaks of the top edge being directly opposite the recesses on the bottom edge, substantially as herein shown, and for the purpose specified.

2. A partition-strip provided at its edge with a notch or recess having both sides beveled or chamfered in an outward direction, and with a hook or shoulder and a slot in its body portion, said hook or shoulder and slot being arranged between the outwardly-beveled notch or recess and the opposite edge of the partition-strip, substantially as described.

3. A partition-strip having within its body portion a slot to form a hook or shoulder at the outer end of said slot, and having at the edge a notch with both sides beveled outwardly, and communicating with the slot by a slit or passage which extends past the hook or shoulder, substantially as described.

4. A partition-strip having within its body portion a series of slots to form hooks or shoulders at the outer ends of said slots, and having at the edges a series of notches with both sides beveled in an outward direction, and communicating with the slots by slits or passages which extend past the hooks or shoulders, substantially as described.

In testimony that I claim the foregoing I have hereunto set my hand and seal this 9th day of May, 1881.

GUSTAV L. JAEGER. [L. S.]

Witnesses:
LOUIS S. HERZFELD,
D. VAN SANTVOORD.